United States Patent
Nie et al.

(10) Patent No.: US 8,978,134 B2
(45) Date of Patent: Mar. 10, 2015

(54) SECURITY CONFIGURATION VERIFICATION DEVICE AND METHOD AND NETWORK SYSTEM EMPLOYING THE SAME

(75) Inventors: Baichuan Nie, Beijing (CN); Jianpeng Sun, Beijing (CN); Jian Ding, Beijing (CN); Dong Xu, Beijing (CN); Zhen Zhou, Beijing (CN)

(73) Assignee: NSFOCUS Information Technology Co., Ltd., Beijing (CN)

( * ) Notice: Subject to any disclaimer, the term of this patent is extended or adjusted under 35 U.S.C. 154(b) by 39 days.

(21) Appl. No.: 13/882,579

(22) PCT Filed: Nov. 18, 2011

(86) PCT No.: PCT/CN2011/001929
§ 371 (c)(1),
(2), (4) Date: Apr. 30, 2013

(87) PCT Pub. No.: WO2012/065367
PCT Pub. Date: May 24, 2012

(65) Prior Publication Data
US 2013/0219496 A1    Aug. 22, 2013

(30) Foreign Application Priority Data
Nov. 18, 2010   (CN) .......................... 2010 1 0549861

(51) Int. Cl.
*G06F 11/10* (2006.01)
*H04L 29/06* (2006.01)

(52) U.S. Cl.
CPC ........ *H04L 63/1408* (2013.01); *H04L 63/1433* (2013.01)
USPC ................................ 726/22; 726/1

(58) Field of Classification Search
CPC .................. H04L 63/1408; H04L 63/1433
USPC ........................................................ 726/22, 1
See application file for complete search history.

(56) References Cited

U.S. PATENT DOCUMENTS

| | | | |
|---|---|---|---|
| 7,574,740 B1 * | 8/2009 | Kennis | 726/22 |
| 2004/0193912 A1 | 9/2004 | Li et al. | |

(Continued)

FOREIGN PATENT DOCUMENTS

| | | |
|---|---|---|
| CN | 1768518 A | 5/2006 |
| CN | 1988478 A | 6/2007 |

(Continued)

OTHER PUBLICATIONS

International Search Report for PCT/CN2011/001929, mailed Feb. 23, 2012.

(Continued)

*Primary Examiner* — Baotran N To
(74) *Attorney, Agent, or Firm* — Withrow & Terranova, P.L.L.C.

(57) ABSTRACT

The invention discloses a security configuration verification device for performing a security configuration verification on a network device, which comprises: one or more preconfigured scanning policies; a scanning policy generator, which selects a scanning policy from the one or more preconfigured scanning policies to generate a new scanning policy corresponding to the network device; and a scanner, which performs the security scanning on the network device with the generated new scanning policy and thereby performs the security configuration verification. The invention also discloses a corresponding security configuration verification method and a network system employing the verification device.

19 Claims, 7 Drawing Sheets

(56) References Cited

U.S. PATENT DOCUMENTS

| | | |
|---|---|---|
| 2008/0055100 A1 | 3/2008 | Marthur et al. |
| 2008/0092237 A1* | 4/2008 | Yoon et al. .................. 726/25 |

FOREIGN PATENT DOCUMENTS

| | | |
|---|---|---|
| CN | 101015185 A | 8/2007 |
| CN | 102075347 A | 5/2011 |
| EP | 1280315 A1 | 1/2003 |
| JP | 2003242112 A | 8/2003 |
| JP | 2004102479 A | 4/2004 |
| JP | 2006184936 A | 7/2006 |
| JP | 2008512042 A | 4/2008 |
| JP | 2008129981 A | 6/2008 |
| JP | 2008299811 A | 12/2008 |
| JP | 200915585 A | 1/2009 |
| JP | 2010117887 A | 5/2010 |

OTHER PUBLICATIONS

Translation of Notification of Reasons for Refusal for Japanese Patent Application No. 2013-539114, mailed Aug. 5, 2014, 4 pages.
First Office Action for Chinese Patent Application No. 201010549861.7, issued Sep. 25, 2012, 13 pages.

* cited by examiner

PRIOR ART

SECURITY CONFIGURATION VERIFICATION DEVICE AND METHOD AND NETWORK SYSTEM EMPLOYING THE SAME

This application is a 35 USC 371 national phase filing of international application number PCT/CN2011/001929, filed Nov. 18, 2011, which claims priority to Chinese national application number 201010549861.7, filed Nov. 18, 2010, the disclosures of which are incorporated herein by reference in their entireties.

FIELD OF THE INVENTION

The invention relates to the field of network security, and in particular, to a security configuration verification device and method for verifying the security configuration of a network device as well as a network system employing the security configuration verification device.

BACKGROUND OF THE INVENTION

With the continuous development of the information technology, the network services and network applications are also ever increasing, and the servers or network devices carrying these network services and network applications also continuously hit the shelves. The security of the servers or network devices also draws more and more attention. When a network service or application is illegally intruded, a most important reason is that the configurations of the servers or network devices by their user are not secure enough, besides the vulnerabilities of these servers or network devices themselves. The deficiencies of the configurations give a hacker an opportunity that can be exploited, and also cause a major damage to a user of a server or a network device.

In order to prevent the loss due to the configuration faults of a server or a network device, a network administrator will generally perform a verification on the security configuration of a server or a network device within a network, and perform a security reinforcement for a server or a network device which does not meet the security configuration specification. Some security manufacturers have provided secure software for a network administrator to perform a scanning on the security configuration of a server or a network device.

Figure 1:
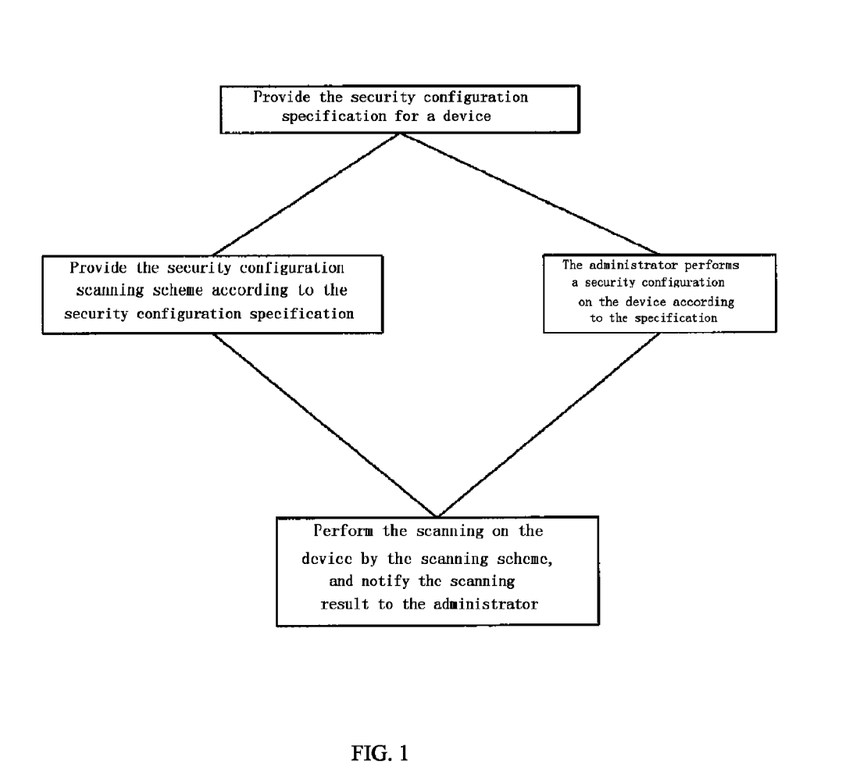
FIG. 1 shows a schematic drawing of a procedure for performing the security configuration verification on a server or a network device traditionally.

FIG. 1 shows a schematic drawing of a procedure for performing security configuration verification on a server or a network device traditionally. As shown in FIG. 1, firstly, a provider of a certain server or a network device will provide a "security configuration specification"; subsequently, while a network administrator performs a security configuration on the server or the network device according to the "security configuration specification", a security manufacturer will customize a security configuration scanning scheme for the server or the network device according to the "security configuration specification. Then, the security manufacturer performs a security configuration scanning on the server or the network device by this security scanning scheme, and notifies the scanning result to the network administrator, and thereby the security configuration of the server or the network device is normalized. Thus, the security reinforcement for the configuration of the server or the network device is accomplished.

However, though the security configuration verification may be performed conveniently on one server or one network device with the existing solution as shown in FIG. 1, the security configuration verification consumes a lot of time due to involving the work of the security manufacturer. If there is not just one server or one network device (generally there will exist more than two different servers or network devices) in the network environment, and it is desired that a security configuration verification is performed on these other devices, then the procedure as described in FIG. 1 needs to be done repeatedly. This means that the more the kinds of servers or network devices in the network environment are, the more the steps that are repeated, and the longer the time is to be consumed. Furthermore, in a different network application scenario, the requirements for the security configuration specification of the server or the network device may also be different from each other, and thus more work of the security manufacturer is needed, which further needs to consume more time and effort.

It can be seen from the above that there needs a security configuration verification way in which a user of a server or a network device or a network administrator may flexibly define his/her own security configuration verification policy by himself/herself according to a different network application environment as well as a different server or network device, so as to save cost and time.

SUMMARY OF THE INVENTION

In view of the above problems, the invention is proposed to provide a security configuration verification device and method as well as a network system employing the security configuration verification device that overcome the above problems or at least in part solve the above problems.

According to an aspect of the invention, a security configuration verification device for performing a security configuration verification on a network device is provided, which comprises: one or more preconfigured scanning policies, each preconfigured scanning policy is corresponding to a kind of network device, wherein each scanning policy comprises one or more security check items, and each security check item is associated with the security configuration on a corresponding network device; a scanning policy generator, which selects a scanning policy from the one or more preconfigured scanning policies to generate a new scanning policy corresponding to a selected network device, a security check item in said new scanning policy being selected from the security check items in the selected preconfigured scanning policy; and a scanner, which performs a security scanning on the selected network device with the generated new scanning policy and thereby performs a security configuration verification, wherein for each security check item in said new scanning policy, it is determined whether the security configuration of the selected network device meets the security check as indicated by the security check item.

The security configuration verification device according to the invention may generate a new scanning policy according to a preconfigured scanning policy so as to perform the security configuration verification on the network device, thereby eliminating the intervention of a security manufacturer, which greatly saves the time for performing the security configuration verification.

Optionally, in said scanning policy generator, a security check item in said new scanning policy is generated by modifying a security check item in the selected scanning policy. Additionally, the selected scanning policy and said new scanning policy correspond to the same type of network device. As such, a new scanning policy adapted for a new network device and a new network application environment may be generated more quickly and accurately according to a preconfigured scanning policy, thereby further saving the time for performing the security configuration verification.

Optionally, the security configuration verification device according to the invention further comprises a report generator, which generates the security configuration verification result relating to the network device based on a security scanning result of the scanner, and a scanning policy memory for storing one or more preconfigured scanning policies.

According to another aspect of the invention, a security configuration verification method for a network device is provided, which method may generate a new scanning policy according to a preconfigured scanning policy so as to perform a security configuration verification on a network device, thereby eliminating the intervention of a security manufacturer, which greatly saves the time for performing a security configuration verification. In particular, the security configuration verification method comprises steps of: selecting a scanning policy from one or more preconfigured scanning policies to generate a new scanning policy corresponding to said network device, wherein each preconfigured scanning policy corresponds to a kind of network device and comprises one or more security check items, and each security check item is associated with the security configuration on the corresponding kind of network device, and wherein a security check item in said new scanning policy is selected from the security check items in the selected preconfigured scanning policy; and performing a security scanning on said network device with the generated new scanning policy, wherein for each security check item in said new scanning policy, it is determined whether the security configuration of said network device meets the security check as indicated by the security check item.

According to yet another aspect of the invention, a network system is provided, which comprises one or more network devices and a security configuration verification device according to the invention for performing the security configuration verification on these network devices.

Since the network system employs a security configuration verification device according to the invention, even if there are a plurality of network devices with different types in the network system, a scanning policy corresponding to these network devices may be conveniently generated to perform an appropriate security configuration verification, thereby saving the time for performing a security configuration verification.

BRIEF DESCRIPTION OF THE DRAWINGS

Various other advantages and benefits will become apparent to those of ordinary skills in the art by reading the following detailed description of the preferred embodiments. The drawings are only for the purpose of showing the preferred embodiments, and are not considered to be limiting the invention. And throughout the drawings, like reference signs are used to denote like components. In the drawings.

DETAILED DESCRIPTION OF THE INVENTION

In the following the particular embodiments of the invention will be described in connection with the drawings.

Figure 2:
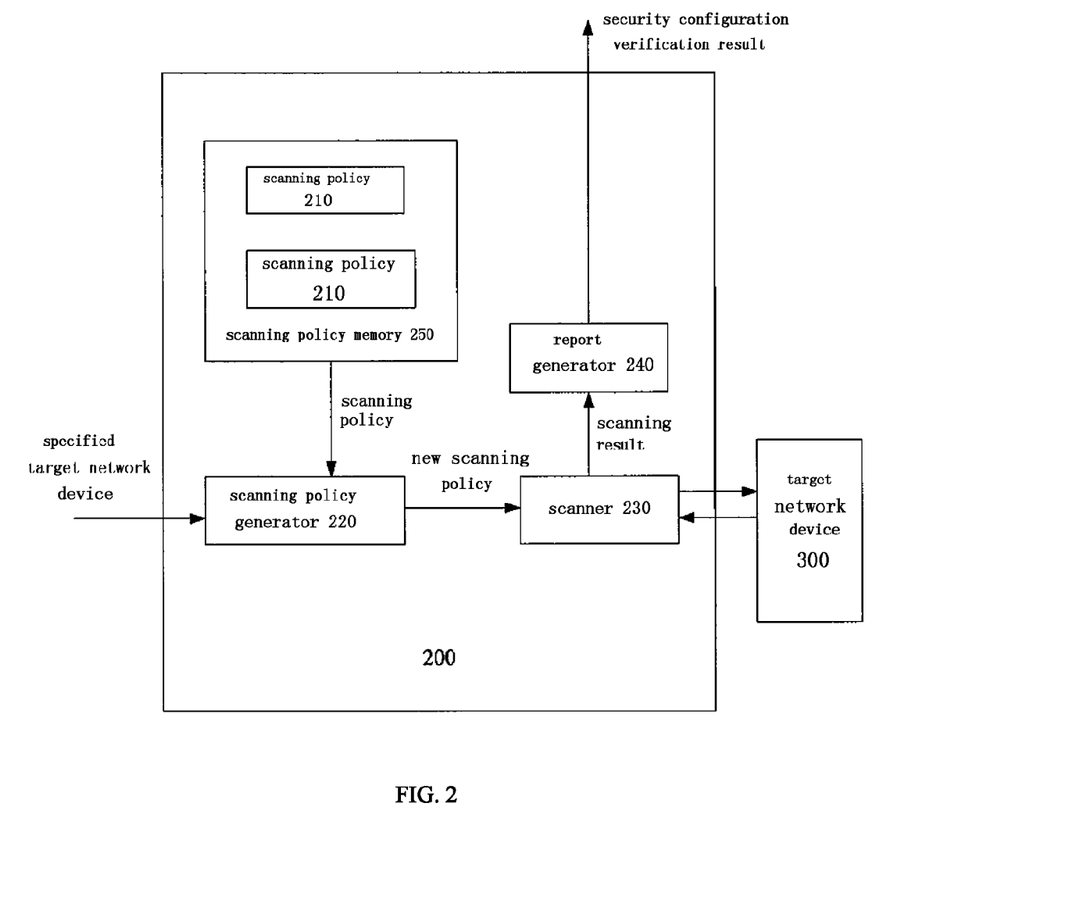
FIG. 2 shows a security configuration verification device according to an embodiment of the invention.

FIG. 2 shows a security configuration verification device 200 according to an embodiment of the invention. As shown in FIG. 2, the security configuration verification device 200 comprises one or more preconfigured scanning policies 210, each scanning policy is corresponding to a kind of network device (Hereinafter, for ease of description, a server and a network device are collectively referred to as a network device). A preconfigured scanning policy is usually pre-customized by a security manufacturer according to a specification provided by a network device provider. For example, depending on the type of a network device, a scanning policy 210 may be selected from a group including the following scanning policies: a Windows scanning policy, a Solaris scanning policy, an Oracle scanning policy, a Cisco Router scanning policy, a Juniper Router scanning policy, a Huawei Router scanning policy, a NETSCREEN scanning policy, a PIX Firewall scanning policy, an Informix scanning policy, an HP Unix scanning policy, an AIX scanning policy, a Linux scanning policy, a Microsoft SQL Server scanning policy, a BIND scanning policy, an Apache scanning policy, an IIS scanning policy, a Tomcat scanning policy, an H3C Switch scanning policy, a fortigate scanning policy, and a Windows-ORACLE scanning policy. Each scanning policy 210 comprises one or more security check items, and each of the security check items is associated with the security configuration on a corresponding network device. For example, in the case of the scanning policy 210 being an HP Unix scanning policy, the corresponding network device at this point is HP Unix, where the security check item may comprise: detecting whether a default user access right conforms to a specification (detecting whether the setting of a default user access right conforms to a security specification according to the security check items), detecting whether telnet restricts a direct remote login by a user with super administrator right, detecting whether ssh restricts a direct remote login by a user with super administrator right, detecting whether the length of a password of a device employing the static password authentication technology conforms to a specification, detecting whether the lifetime of a password of a device employing the static password authentication technology meets a specification, and detecting that a device employing the static password authentication technology cannot use the passwords set within the last specified number of times, and so on. According to the type difference of the network device corresponding to a scanning policy, the scanning policy may have a different type and number of security check items. Furthermore, even for network devices of the same type, it is also possible to preconfigure a scanning policy adapted for a different network application environment. For example, for a NETSCREEN network device, a different scanning policy may be preconfigured according to whether the network device is used in a public network or in a local area network.

The security configuration verification device 200 further comprises a scanning policy generator 220, which generates a new scanning policy for a target network device on which the security configuration verification is to be performed. The scanning policy generator 220 selects one or more scanning policies from a preconfigured scanning policy 210 to generate a new scanning policy corresponding to the target network device.

Figure 3:
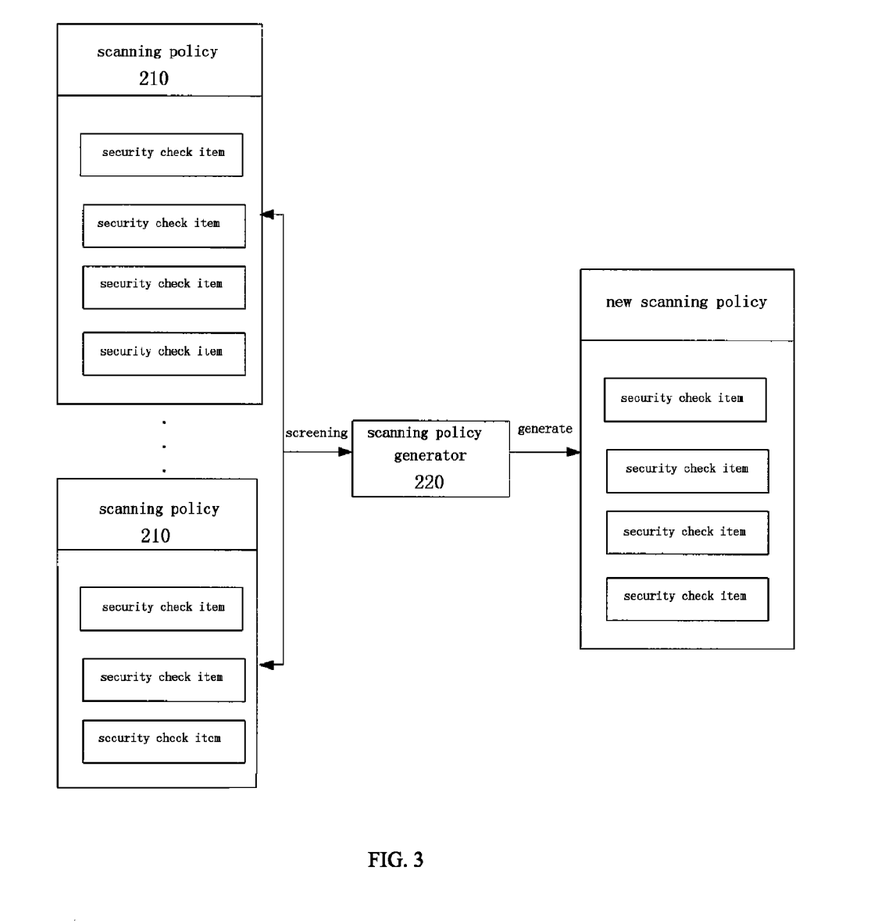
FIG. 3 shows a schematic drawing of generating a new scanning policy by a scanning policy generator in a security configuration verification device according to an embodiment of the invention.

FIG. 3 shows a schematic drawing of generating a new scanning policy by a scanning policy generator 220. In the new scanning policy, the security checks item therein are obtained by selecting from the security check items in a selected preconfigured scanning policy 210. Optionally, a security check item of the new scanning policy may be selected from one preconfigured scanning policy 210, and may also be selected from a plurality of preconfigured scanning policies. Based on the type of the target network device and the network application environment, the scanning policy generator 220 screens out security check items suitable for the target network device from the security check items of one or more selected preconfigured scanning policies 210 to construct a new scanning policy.

Optionally, when the security check item of the preconfigured scanning policy 210 does not conform to the network application environment of the target network device, the scanning policy generator 220 may modify the parameter of the security check item to obtain a security check item pertaining to the new scanning policy. Since now only the parameter of the security check item is needed to be modified without creating a new security check item from scratch, a security check item may be established quickly. To give an example, for an existing security check item "detecting that a user of a device employing the static password authentication technology cannot repeatedly use the passwords used within the last eight times (including the eighth time)", the parameter "eight times" therein may be modified according to the network application environment to construct a new security check item.

Of course, the scanning policy generator 220 may also newly create a security check item according to the type of the target network device. For example, in the case that the type of the target network device is a Windows operating system, a security check item may be established with respect to the content value of a certain registry entry. For other types of the network device, there are other ways to create the new security check item, all of which fall within the protection scope of the invention.

Further, optionally, the new scanning policy may be selected from the preconfigured scanning policies whose associated type of network devices is the same as that of the target network device. For example, when the target network device is Windows, a security check item of the new scanning policy may be selected from individual preconfigured scanning policies for Windows. As such, a new scanning policy may be constructed quickly and accurately.

After the scanning policy generator 220 constructs the new scanning policy, the scanner 230 in the security configuration verification device 200 performs a security scanning on the target network device 300 based on the new scanning policy so as to perform the security configuration verification. For each security check item in the new scanning policy, the scanner 230 determines whether the security configuration of the target network device 300 meets the security check content as indicated by the security check item. The scanner 230 may employ any known way in the art to perform the detection of the content as indicated by the security check item. For example, the scanner 230 may, based on the content of the security check item, generate a script to be executed on the target network device 300 after being logged in, execute the script on the target network device 300, and determine whether the target network device 300 meets the security check item according to the execution result of the script. All these checking ways fall within the protection scope of the invention.

Optionally, the security configuration verification device further comprises a report generator 240, which generates the security configuration verification result regarding target network device 300 based on the security scanning result from the scanner 230, such that the system administrator of the target network device 300 may modify the security configuration on the target network device 300 according to the verification result, thereby improving the security of the target network device 300.

In addition, the security configuration verification device 200 further comprises a scanning policy memory 250 for storing the one or more preconfigured scanning policies 210.

The security configuration verification device 200 may generate a new scanning policy according to the preconfigured scanning policy 210 so as to perform the security configuration verification on a target network device 300, thereby eliminating the intervention of a security manufacturer, which greatly saves the time for performing the security configuration verification.

Figure 4:
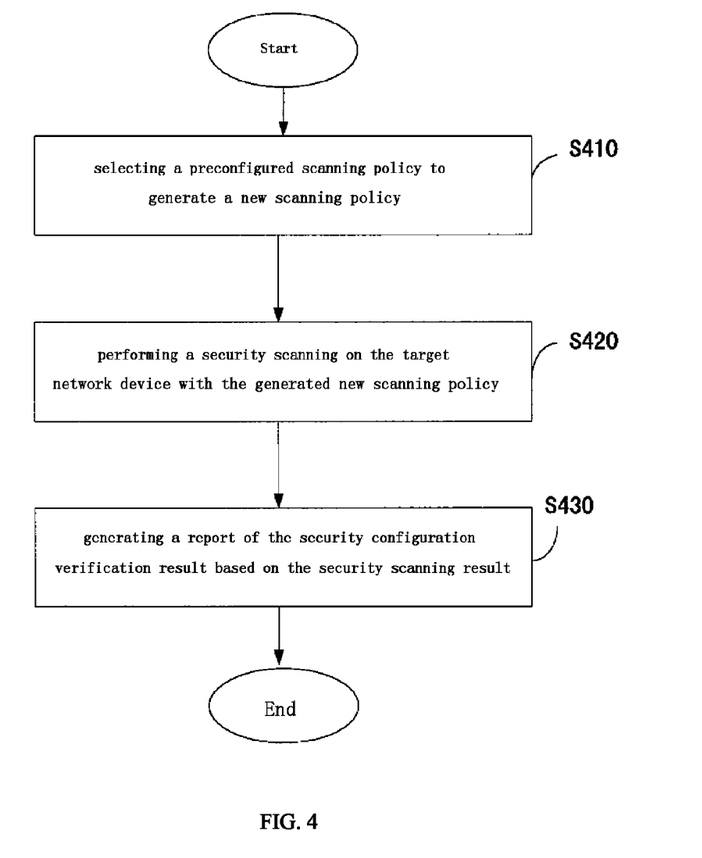
FIG. 4 shows a security configuration verification method according to an embodiment of the invention.

FIG. 4 shows a security configuration verification method according to an embodiment of the invention, which method may be implemented by a security configuration verification device 200 so as to perform a security configuration verification on a network device. As shown in FIG. 4, the method begins at step S410, where a scanning policy is selected from one or more preconfigured scanning policies to generate a new scanning policy corresponding to the target network device. As described above, each preconfigured scanning policy corresponds to one kind of network device and comprises one or more security check items, and each security check item is associated with the security configuration on the corresponding kind of network device.

At step S410, based on the type of the target network device and the network application environment, the new scanning policy is generated by screening out the security check items suitable for the target network device from the security check items in the selected preconfigured scanning policy. Optionally, a security check item of the new scanning policy may be selected from one preconfigured scanning policy, and may also be selected from a plurality of preconfigured scanning policies. Further, optionally, when a security check item of a preconfigured scanning policy does not conform to the network application environment of the target network device, the parameters of the security check item may be modified to obtain a security check item pertaining to the new scanning policy. Since now only the parameters of the security check item are needed to be modified without creating a new security check item from scratch, a security check item may be established quickly. Further, optionally, the new scanning policy may be selected from the preconfigured scanning policies whose associated type of network device is the same as that of the target network device.

Optionally, step S410 may be performed by the above-mentioned scanning policy generator 220.

After the new scanning policy adapted for the target network device is constructed at step S410, a security scanning is performed on the target network device using the generated new scanning policy at step S420, where for each security check item in the new scanning policy, it is determined whether the security configuration of the target network device meets the security check as indicated by the security check item. At step S420, any known way in the art may be employed to perform the detection of the content as indicated by the security check item. For example, a script to be executed on the target network device after being logged in may be generated based on the content of a security check item, the script may be executed on the target network device, and it may be determined whether the target network device meets the security check item according to the execution result of the script. All these checking ways fall within the protection scope of the invention.

Optionally, step S420 may be performed by the above-mentioned scanner 230.

After a security configuration verification is performed on the target network device at step S420, optionally, the method further comprises step S430, where the security configuration verification result regarding the target network device is generated based on the security scanning result at step S420, such that the system administrator of the target network device may modify the security configuration on the target network device according to the verification result, thereby improving the security of the target network device.

Figure 5:
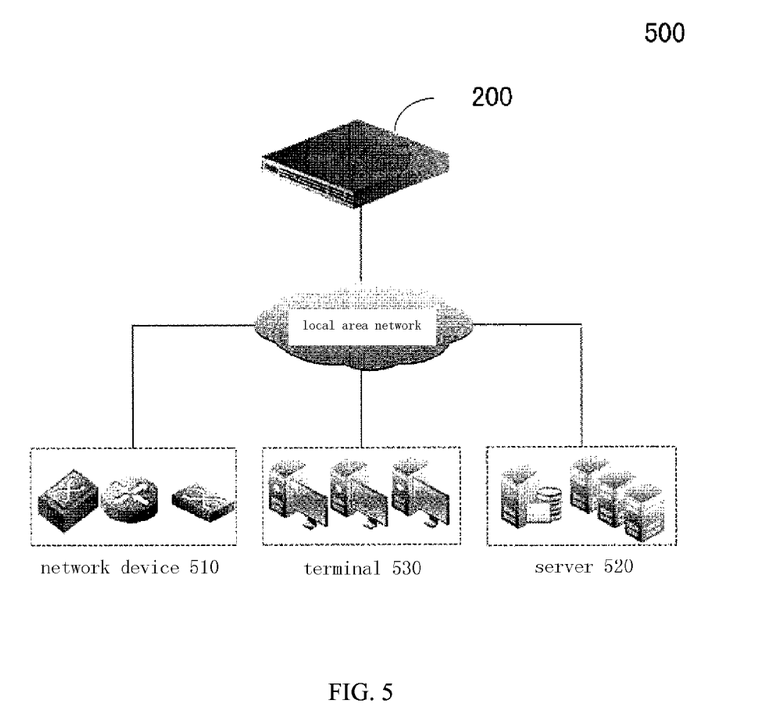
FIG. 5 shows a network system according to an embodiment of the invention in which a security configuration verification device is employed.

FIG. 5 shows a network system 500 according to an embodiment of the invention in which a security configuration verification device 200 is employed. As shown in FIG. 5, the network system 500 comprises a plurality of network devices interconnected via a local area network 540, and these network devices comprise a server 520 and a terminal 530, etc., besides traditional network devices 510 such as a gateway, a router. The security configuration verification device 200 is also interconnected with these network devices via the local area network 540, so as to be able to verify the security configuration of these network devices. In this way, the system administrator may utilize one security configuration verification device 200 to perform the security configuration verification on all the network devices in the network system 500.

Figure 6:
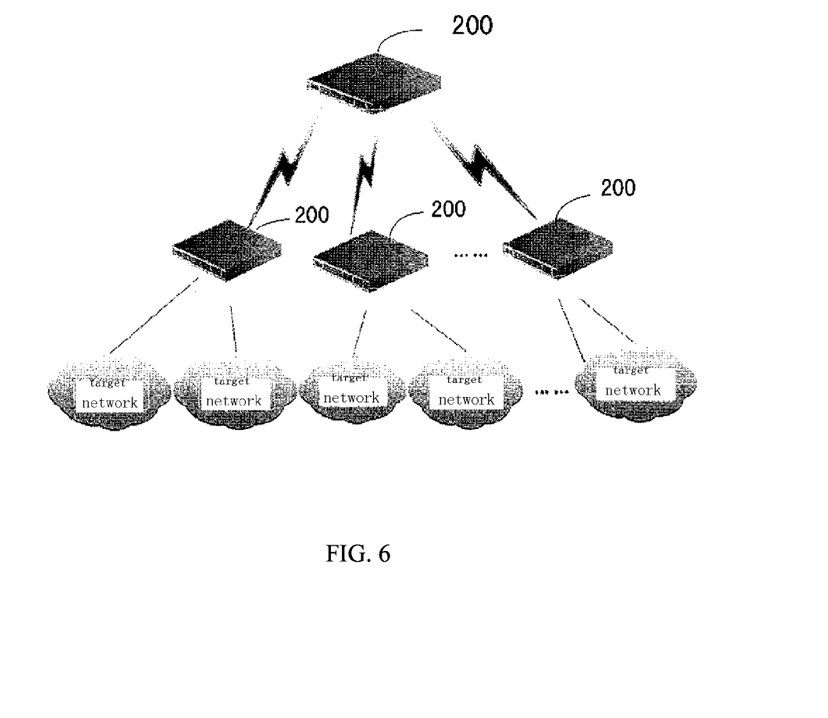
FIG. 6 shows a network system according to another embodiment of the invention in which a security configuration verification device is employed.

In addition, for some large networks, because of the complex organizational structure, numerous distribution points and relatively dispersed data, etc., a distributed deployment of a plurality of security configuration verification devices 200 may be utilized to achieve the security configuration verification for network devices in the whole network system. FIG. 6 shows such an instance. As shown in FIG. 6, a distributed deployment is made to the security configuration verification devices 200 and it supports the data sharing and aggregation among the individual verification devices, thereby facilitating a centralized management of a distributed network by a user. In the network system 600 in FIG. 6, there are a plurality of network devices grouped according to the network topology, each group of network devices are verified by the corresponding security configuration verification device, and the verified data may be shared or aggregated among individual verification devices, which makes it possible for the security configuration verification device 200 according to the invention to be applied in a large network.

Since in the invention a security configuration scanning scheme may be customized flexibly and such customization absolutely depends on the demand of a user, the user may perform a security scanning more flexibly on the configuration of a server or a network device, and a large amount of time and cost may be saved.

It is to be noted that, in individual components of the security configuration verification device according to the invention, the components therein are divided logically according to the functions to be realized by them, however, the invention is not limited thereto, and individual components may be re-divided or combined as desired, for example, some components may be combined into a single component, or some components may be further divided into more sub-components.

Embodiments of the individual components of the invention may be implemented in hardware, or in a software module running on one or more processors, or in a combination thereof. It will be appreciated by those skilled in the art that, in practice, some or all of the functions of some or all of the components in the security configuration verification device according to embodiments of the invention may be implemented by using a microprocessor or a digital signal processor (DSP). The invention may also be implemented as a device or a means program (e.g., a computer program or a computer program product) for carrying out a part or all of the method described herein. Such a program implementing the invention may be stored on a computer readable medium.

Figure 7:
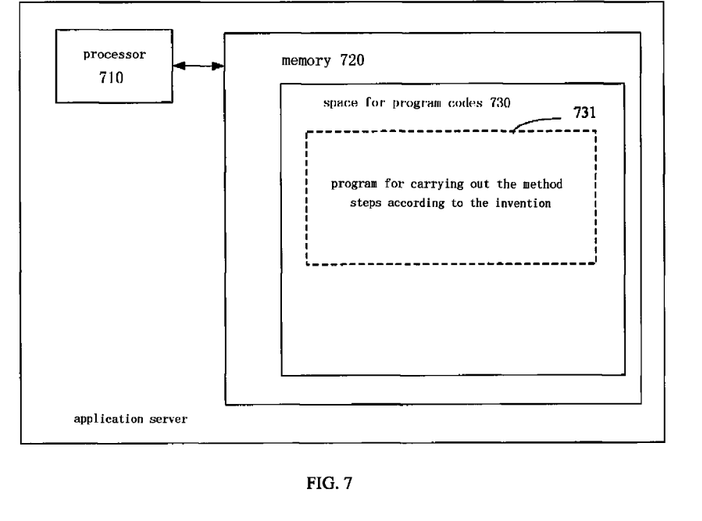
FIG. 7 shows schematically a block diagram of a server for performing a security configuration verification method according to the invention.
Figure 8:
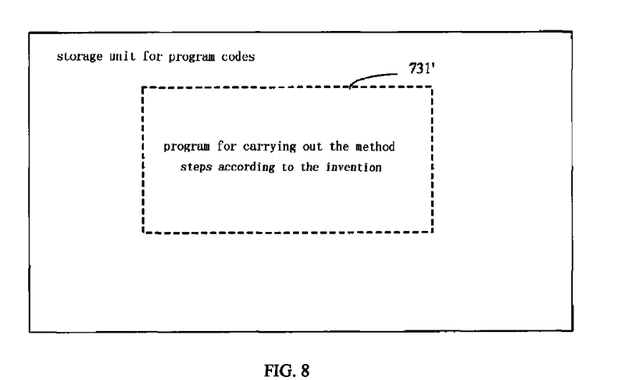
FIG. 8 shows schematically a storage unit for holding or carrying a program code for implementing a security configuration verification method according to the invention.

For example, FIG. 7 shows a server which may carry out the security configuration verification method according to the invention, e.g., an application server. The server traditionally comprises a processor 710 and a computer program product or a computer readable medium in the form of a memory 720. The memory 720 may be an electronic memory such as a flash memory, an EEPROM (electrically erasable programmable read-only memory), an EPROM, a hard disk or a ROM. The memory 720 has a memory space 730 for program codes 731 used for carrying out any method steps of the method as described above. For example, the memory space 730 for the program codes may comprise individual program codes 731 for carrying out individual steps in the above method, respectively. These program codes may be read from or written to one or more computer program products. These computer program products comprise such a program code carrier as a hard disk, a compact disk (CD), a memory card or a floppy disk. Such a computer program product is generally a portable or stationary storage unit as described with reference to FIG. 8. The storage unit may have a memory segment, a memory space, etc. arranged similarly to the memory 720 in the server of FIG. 7. The program codes may for example be compressed in an appropriate form. In general, the storage unit comprises computer readable codes 731', i.e. the codes that may be read by for example a processor such as 710, and when run by a server, these codes cause the server to carry out individual steps in the method described above.

It is to be noted that the above embodiments illustrate rather than limit the invention, and those skilled in the art may design alternative embodiments without departing the scope of the appended claims. In the claims, any reference sign placed between the parentheses shall not be construed as the limitation to a claim. The word "comprise" does not exclude the presence of an element or a step not listed in the claims. The word "a" or "an" preceding an element does not exclude the presence of a plurality of such elements. The invention may be implemented by means of a hardware comprising several distinct elements and by means of a suitably programmed computer. In a unit claim enumerating several means, several of the means may be embodied by one and the same hardware item. The use of the words first, second, and third, etc. does not mean any ordering. Such words may be construed as naming.

The invention claimed is:

1. A security configuration verification device comprising:
one or more preconfigured scanning policies, each preconfigured scanning policy is corresponding to a kind of network device, wherein each scanning policy comprises one or more security check items, and each security check item is associated with the security configuration on the corresponding network device;

a scanning policy generator for selecting a scanning policy from the one or more preconfigured scanning policies to generate a new scanning policy corresponding to both a selected network device and a network application environment of the selected network device, the security check items in said new scanning policy being selected from the security check items in the selected preconfigured scanning policy, wherein when the security check items of the selected network device do not conform to the network application environment of the selected network device, the security check items in said new scanning policy are generated by modifying the security check items in the selected scanning policy; and a scanner for performing a security scanning on the selected network device with the generated new scanning policy and thereby performing the security configuration verification, wherein for each security check item in said new scanning policy, determining whether the security configuration of the selected network device meets the security check as indicated by the security check item.

2. The security configuration verification device as claimed in claim 1, wherein in said scanning policy generator, the security check items in said new scanning policy are generated by modifying the security check items in the selected scanning policy.

3. The security configuration verification device as claimed in claim 1, wherein in said scanning policy generator, the selected scanning policy and said new scanning policy correspond to a network device of the same type.

4. The security configuration verification device as claimed in claim 1, further comprising:
a report generator for generating the security configuration verification result regarding the selected network device based on a security scanning result of the scanner.

5. The security configuration verification device as claimed in claim 1, further comprising:
a scanning policy memory for storing the one or more preconfigured scanning policies.

6. The security configuration verification device as claimed in claim 1, wherein the security configuration verification device is comprised in a network system having one or more network devices, and the network system performs is adapted to perform the security configuration verification on the one or more network devices.

7. The security configuration verification device as claimed in claim 6, wherein the network system comprises a plurality of network devices, the plurality of network devices being divided into a plurality of groups; and
each group of network devices incorporates a security configuration verification device so as to perform the security configuration verification on the network devices in the group of network devices.

8. The security configuration verification device as claimed in claim 2, wherein the security configuration verification device is comprised in a network system having one or more network devices, and the network system is adapted to perform the security configuration verification on the one or more network devices.

9. The security configuration verification device as claimed in claim 3, wherein the security configuration verification device is comprised in a network system having one or more network devices, and the network system is adapted to perform the security configuration verification on the one or more network devices.

10. The security configuration verification device as claimed in claim 4, wherein the security configuration verification device is comprised in a network system having one or more network devices, and the network system is adapted to perform the security configuration verification on the one or more network devices.

11. The security configuration verification device as claimed in claim 5, wherein the security configuration verification device is comprised in a network system having one or more network devices, and the network system is adapted to perform the security configuration verification on the one or more network devices.

12. A security configuration verification method for a network device comprising steps of:
selecting a scanning policy from one or more preconfigured scanning policies to generate a new scanning policy corresponding to both said network device and a network application environment of the selected network device, wherein each preconfigured scanning policy corresponds to a kind of network device and comprises one or more security check items, and each security check item is associated with the security configuration on the corresponding kind of network device, and wherein the security check items in said new scanning policy are selected from the security check items in the selected preconfigured scanning policy, wherein when the security check items of the selected network device do not conform to the network application environment of the selected network device, the security check items in said new scanning policy are generated by modifying the security check items in the selected scanning policy; and
performing a security scanning on said network device using the generated new scanning policy, wherein for each security check item in said new scanning policy, determining whether the security configuration of said network device meets the security check as indicated by the security check item.

13. The security configuration verification method as claimed in claim 12, wherein the step of selecting the scanning policy from one or more preconfigured scanning policies to generate a new scanning policy corresponding to said network device further comprises: generating the security check items in said new scanning policy by modifying the security check items in the selected scanning policy.

14. The security configuration verification method as claimed in claim 13, wherein the step of selecting the scanning policy from one or more preconfigured scanning policies to generate the new scanning policy corresponding to said network device further comprises: generating the new scanning policy by selecting the scanning policy from the preconfigured scanning policies corresponding to a network device whose type is the same as that of said network device.

15. The security configuration verification method as claimed in claim 12, further comprising the step of: generating the security configuration verification result regarding the network device based on the security scanning result.

16. The security configuration verification method as claimed in claim 12, further comprising a computer program comprising a computer readable code that, when running on a server, causes the server to carry out the security configuration verification method.

17. The security configuration verification method as claimed in claim 16, wherein the computer program is stored on a non-transitory computer readable medium.

18. The security configuration verification method as claimed in claim 13, further comprising a computer program comprising a computer readable code that, when running on a server, causes the server to carry out the security configuration verification method.

19. The security configuration verification method as claimed in claim 14, further comprising a computer program comprising a computer readable code that, when running on a server, causes the server to carry out the security configuration verification method.

* * * * *